Dec. 9, 1941.  H. PERRY ET AL  2,265,308
APPARATUS FOR TEMPERING GLASS
Original Filed March 1, 1937   6 Sheets-Sheet 1

INVENTORS:
Harold Perry
Augustus William Grofefeld
By
their ATTY.

FIG. 5.

Dec. 9, 1941.    H. PERRY ET AL    2,265,308
APPARATUS FOR TEMPERING GLASS
Original Filed March 1, 1937    6 Sheets-Sheet 5

Harold Perry
Augustus William Grotefeld
INVENTOR
By Otto Munk
their ATT'Y.

Dec. 9, 1941.   H. PERRY ET AL   2,265,308
APPARATUS FOR TEMPERING GLASS
Original Filed March 1, 1937   6 Sheets-Sheet 6

Harold Perry
Augustus William Grotefeld
INVENTORS
By Otto Munk
their ATT'Y.

Patented Dec. 9, 1941

2,265,308

UNITED STATES PATENT OFFICE 2,265,308

APPARATUS FOR TEMPERING GLASS

Harold Perry and Augustus William Grotefeld, Stone, England, assignors to Gilt Edge Safety Glass Limited, Stone, England, a company of Great Britain Original application March 1, 1937, Serial No. 128,436, now Patent No. 2,199,511, dated May 7, 1940. Divided and this application August 23, 1937, Serial No. 160,360. In Great Britain March 5, 1936

7 Claims. (Cl. 49—45)

This invention relates to apparatus for tempering glass by the process of the kind wherein the surface of the glass when in a heated state, usually at the temperature of softening, is subjected to a cooling medium and cooled rapidly so that the glass is toughened or hardened and enabled to resist blows or shocks, one form of apparatus of this kind forming the subject of our pending prior Patent Application No. 42,770, which issued as Patent No. 2,199,511, dated May 7, 1940. The present application is a divisional application from our Patent application No. 128,436 filed March 1, 1937.

In the specification of prior patent application No. 42,770 we have described such a process in which the cooling medium comprises water in a fine state of division.

Whether water or other liquid is employed as the cooling medium, owing to the high cooling capacity of all liquids, it is very necessary that the cooling medium should be applied substantially uniformly to the surface of the glass whatever the liquid may be.

Further, as a result of the high cooling capacity of all liquids as compared with the cooling capacity of gases, it is necessary that the rate of discharge of the liquid itself onto the glass should be small, otherwise the cooling effect would be too severe and the glass would fracture during tempering.

It is further necessary that the rate of cooling of the glass should be varied in accordance with its mass and thickness, and owing to the small quantity of liquid which must be discharged in a given time, it is therefore necessary that the rate of discharge of the liquid on to the surface of the glass should be capable of accurate control.

One of the objects of this invention is to provide means whereby this accurate control can be obtained.

A further object of the invention is to improve generally the construction of the tempering apparatus described in our said prior specification No. 42,770.

Other objects will become apparent from the following description of our invention in which.

In the construction illustrated in Figures 1 to 9, the plant is arranged in a manner generally similar to the arrangement described in our said prior specification No. 42,770, the plant comprising a main heating furnace shown generally at 15 for heating the glass sheets to the required temperature prior to tempering, and apparatus shown generally at 16 for cooling the glass sheets rapidly to impart thereto the requisite toughness or temper.

The furnace 15 is constructed as described in the said prior specification.

As is described in the said specification, for supporting the sheets during the heating and subsequent tempering operations there is provided a horizontal supporting rail 19 which extends through the upper part of the interior of the furnace, the rail with the present construction projecting beyond each opening thereof.

Conveniently the length of the rail is such that it extends through and beyond that end of the cooling apparatus which is remote from the furnace.

Arranged at one side of the main supporting rail 19 and extending horizontally and parallel thereto is a return supporting rail 20.

For feeding the sheets to the main supporting rail and for transferring the latter to the return rail there is provided transfer apparatus which is disposed adjacent each end of the main supporting and return rails.

Conveniently each transfer apparatus comprises a transfer rail 21 and 22 extending parallel to the supporting and return rails and of a length considerably shorter than the latter but of a configuration otherwise similar thereto, and each transfer rail is mounted for movement in a direction transverse to the supporting and return rails in a manner which will not further be described in the present specification as such feature forms no part of the invention claimed.

Figure 6:
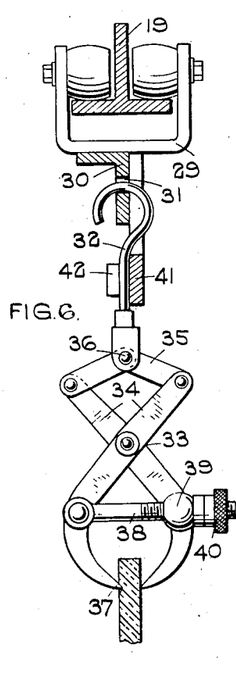
Figure 6 is a sectional view on the line 6—6 of Figure 4 illustrating the means employed for supporting the glass sheets.

For supporting the glass sheets there are provided carriages 29, illustrated in Figure 6, constructed as described in the said prior specification, and connected together by a tongs supporting strip 30 secured to the base of each carriage and extending longitudinally of the rail, the tongs supporting strip being provided with a plurality of spaced holes 31 for the reception of hooks 32 which serve to carry the tongs 33 shown in Figure 6 for supporting the glass sheets.

Conveniently, the tongs are constructed as toggles comprising a pair of arms 34 connected pivotally intermediate their ends, the upper end of each arm being pivoted to one end of a pair of links 35 connected pivotally together and to the hooks 32 at 36.

The opposite ends of the arms 34 are pointed to provide jaws 37 which are adapted to engage and grip the sheet adjacent the upper edge thereof, and it should be noted that the jaws must not be too sharp or the glass is liable to be fractured, the degree of pointing of the ends of the arms being preferably as illustrated.

The weight of the glass sheets acting upon the jaws serves to maintain the latter in gripping engagement with the sheets, but it is preferred to provide means for positively maintaining such engagement while permitting of a free inward movement of the jaws in relation to the sheet, and conveniently such means comprises a rod 38 mounted pivotally upon the lower end of one of the arms 34 of the tongs, the rod extending substantially horizontally through an eye 39 carried pivotally upon the lower end of the other arms of the tongs. The outer end of this is threaded and carries a nut 40 which is adapted to engage the outer side of the eye so that the outward movement of the jaws in relation to each other and to the surface of the sheet can be limited, and the extent of such movement adjusted in accordance with the thickness of the sheet.

Conveniently the tongs are made of Hadfields manganese steel or from other heat resisting metal.

For locating the tongs against lateral movement in relation to the carriages and supporting rail, the tongs supporting strip is provided with a spacing strip 41, the latter carrying on one side a plurality of hooks 42 which extend partially around the supporting hooks 32 of each pair of tongs and thus serve to locate the latter.

As is described in the said specification, for closing the openings in the heating furnace 15, each end thereof is provided with a main door 43.

Figure 1:
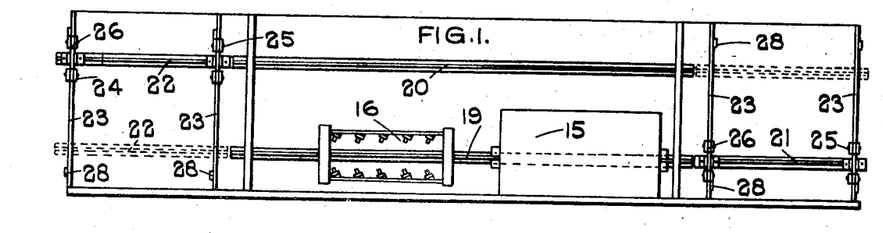
Figure 1 is a diagrammatic plan view of a complete plant for use in tempering glass sheets by the process forming the subject of the present invention.
Figure 2:
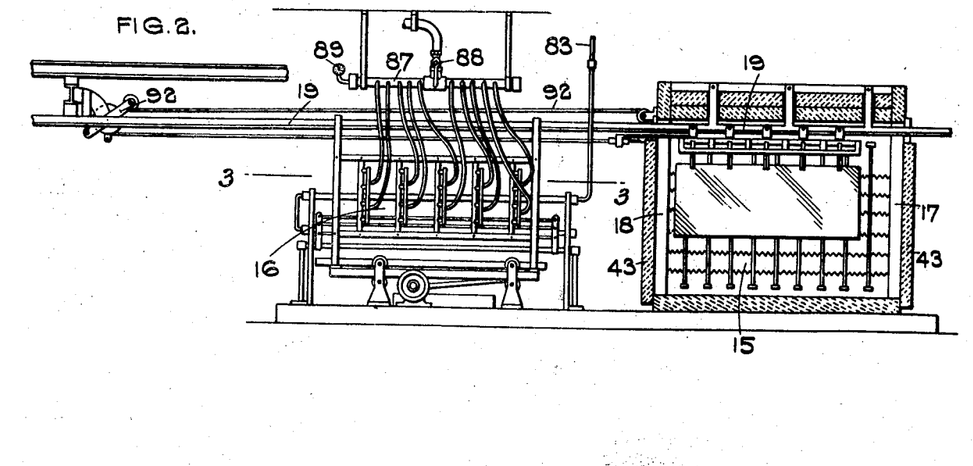
Figure 2 is a side elevation of the same plant illustrating particularly the cooling apparatus and the heating furnace, the latter being shown in section.
Figure 3:
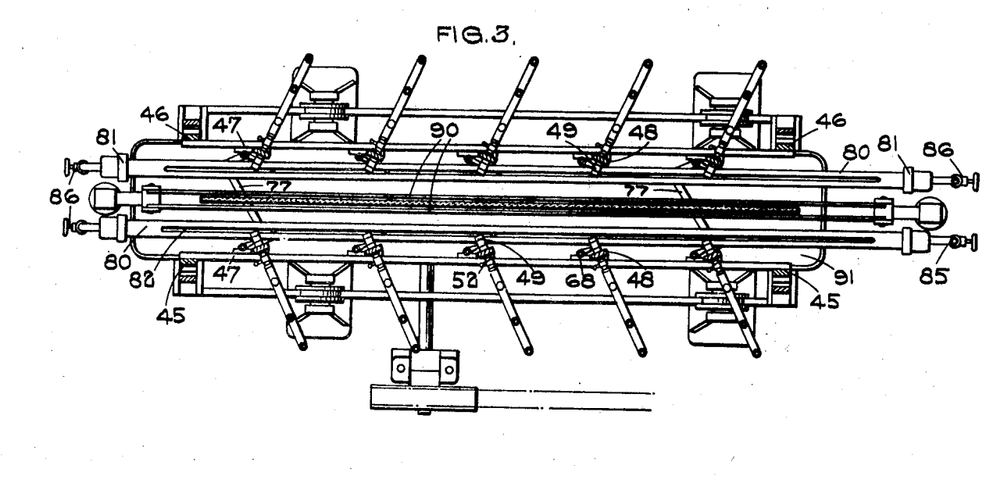
Figure 3 is a sectional plan view of the cooling apparatus taken on the line 3—3 of Figure 2.
Figure 4:
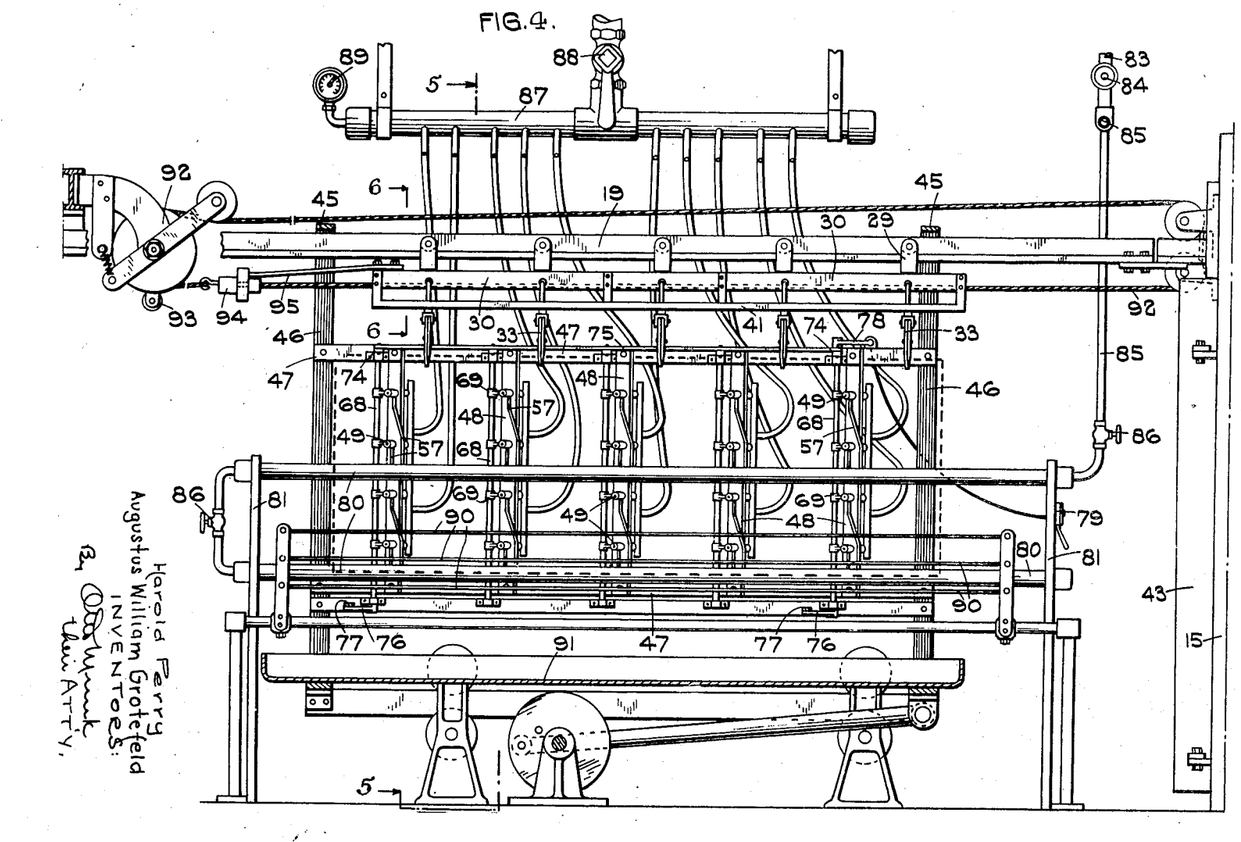
Figure 4 is an enlarged cross sectional side elevation of the cooling apparatus shown in Figure 2.
Figure 5:
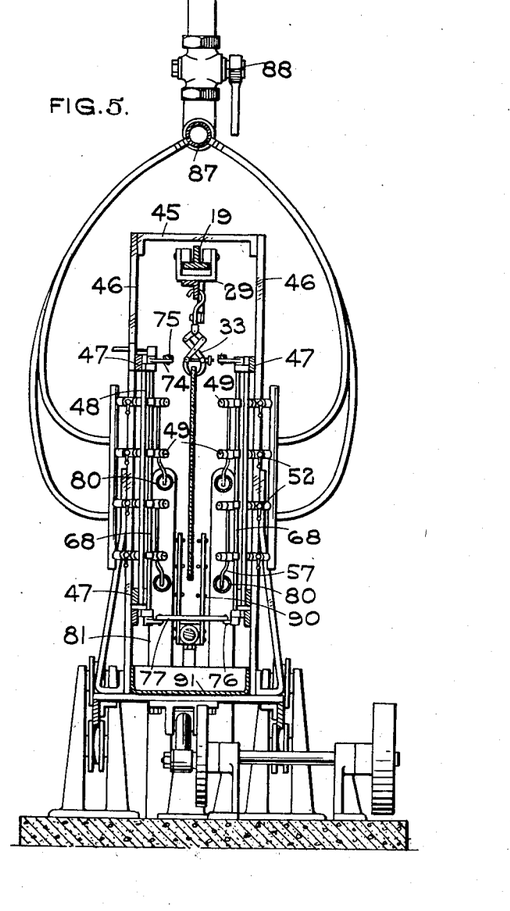
Figure 5 is a sectional view on the line 5—5 of Figure 4.

The apparatus for cooling the glass sheets after heating, which is shown generally at 16 in Figures 1 and 2, comprises a pair of vertical frames 45 disposed adjacent the withdrawal opening 18 of the furnace, the frames being spaced apart to permit of the reception of the sheets therebetween.

Each frame is constructed as described in the said specification, being built up from strip metal and including a pair of vertical struts 46 connected by a pair of spaced horizontal members 47, the frames being connected together in spaced relationship and mounted for movement together in a longitudinal direction, crank and connecting rod mechanism as described in the said specification being provided for reciprocating the frames in such direction.

The horizontal members 47 of each frame carry intermediate their ends a plurality of spaced vertical nozzle carriers 48 constructed as metal strips, upon which are mounted a plurality of nozzles 49 spaced apart one above the other so that a number of horizontal rows of nozzles are provided in the manner described in the said specification.

Figure 7:
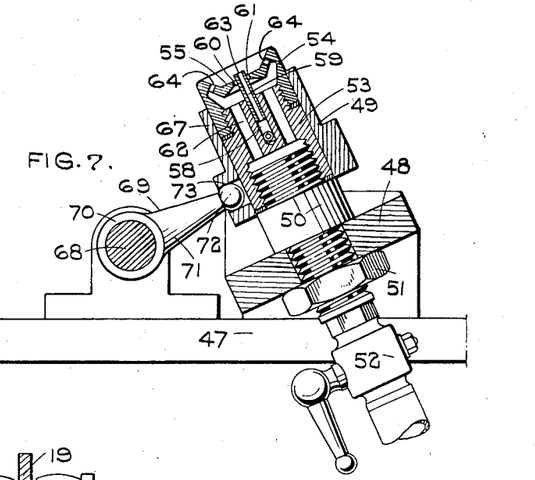
Figures 7 and 8 are part sectional views taken at right angles to one another illustrating the nozzles employed for directing the cooling medium on to the sheets during tempering.
Figure 8:
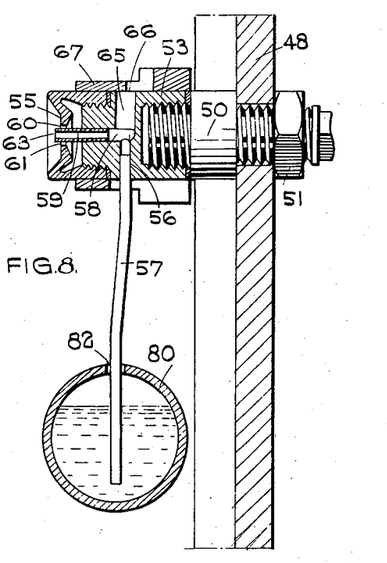

As is described in the said specification, the nozzles which are shown more clearly in Figures 7 and 8 comprise each a hollow cylindrical portion 50 shouldered intermediate its ends and provided with a nut 51 for securing the nozzle in position upon the carrier 48, one end of each portion 50 being connected to a nozzle control cock 52, and the other end carrying an extension piece 53 secured detachably thereto, the extension piece being of reduced cross section at its inner or forward end, such end carrying detachably a removable jet piece 54 of hollow cylindrical form which is closed at its outer end by a circular part 55.

Each extension piece 53 is formed with a radial opening 56 within which is secured one end of a vertical liquid distributing pipe 57 of small cross section, and the inner end of the pipe 57 is in communication with a central cylindrical opening 58 formed in the inner end of the extension piece 53, and within this opening a cylindrical jet 59 is mounted frictionally so that the jet can be adjusted axially of the nozzle to vary the amount of liquid delivered.

The said circular portion 55 of the jet piece 54 is provided centrally with a circular opening 60 through which the forward end of the jet 59 extends, the said opening being of a diameter somewhat larger than the external diameter of the jet to provide a main air discharge orifice 61 of annular configuration.

The circular portion 55 of the jet piece is conveniently spaced somewhat from the adjacent end of the extension piece 53 and the latter is formed with a pair of longitudinal passages 62 arranged horizontally on opposite sides of the central axis of the extension piece, such passages providing a communication between the interior of the hollow cylindrical portion 50 of the jet and the main air discharge orifice 61.

With such an arrangement on supplying air under pressure to the control cock of each nozzle so that the air passes through the interior of the nozzle and through the passages 62 to the discharge orifice 61, an annular jet or current of air moving at high velocity is produced around the orifice 63 of the jet 59 so that a depression or reduction in pressure is produced within the interior of the jet 59 and the opening 58, and liquid is sucked out of the jet by the high velocity air current to produce a spray of liquid in a fine state of division which is carried or propelled by the high velocity air current on to the adjacent face of the sheet, the degree of fineness of the liquid being enhanced by arranging for the end of the jet 59 to project somewhat beyond the main air discharge orifice 60 in the manner illustrated in the drawings.

As is described in the said specification, to reduce divergence of the spray as much as possible and to produce a substantially uniform spray over a substantial area of the adjacent face of the sheet, the end of each jet piece 54 is recessed inwardly as indicated, while in order that the spray shall be of elongated form in cross section, the jet piece is provided also with a pair of auxiliary air discharge orifices 64 arranged horizontally on opposite sides of the main air discharge orifice 60 as described in the said specification.

In order that the amount of liquid delivered from each nozzle can be varied accurately, so that the rate of discharge of the liquid on to the sheet can be maintained at the optimum value whatever the thickness and area of the sheet operated upon, the radial opening 56 provided in each nozzle is extended diametrically through the extension piece 53 of the nozzle, the extended part being of increased diameter to provide a vent passage 65 of a comparatively large cross sectional area which at its outer end 66 is adapted to communicate with the atmosphere.

Mounted for axial sliding movement upon the exterior of each nozzle is a cylindrical control sleeve 67, the outer end of which is adapted to slide over the open end 66 of the vent passage 65 and thus close or partially close the communication between the latter and the atmosphere.

For controlling the axial position of each sleeve there is provided control mechanism comprising a plurality of spindles 68 arranged vertically each adjacent one of the nozzle carriers 48 of each frame and supported from the latter for pivotal movement about a vertical axis.

Mounted in spaced relationship upon each of the nozzle control spindles are a plurality of crank members 69 of a number corresponding to the number of nozzles carried by the adjacent nozzle carrier, and each crank member is conveniently constructed in the form of a hollow boss 70 secured non-rotatably to the spindle, the boss having an integral horizontal arm 71 the free end 72 of which is of part-spherical shape and projects into a horizontal radial opening 73 formed adjacent the inner end of the corresponding nozzle control sleeve.

Figure 9:
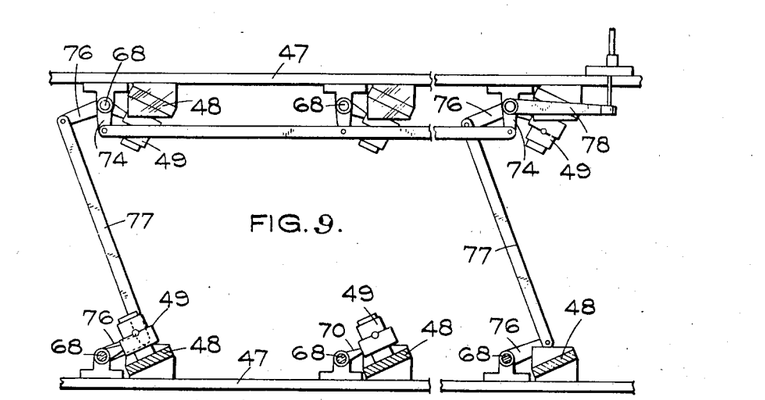
Figure 9 is a plan view illustrating the mechanism employed for controlling the amount of liquid supplied by each nozzle.

As shown in Figure 9, the nozzle control spindles of each frame are each provided at their upper end with a horizontal crank 74 formed of strip metal and extending towards the opposite frame, and each of these cranks is connected pivotally at its free end to a common horizontal connecting link 75 one of which links is provided for each frame, while in addition the nozzle control spindles of each frame are connected operably together by providing the lower ends of the spindles which are at opposite ends of each of the frames with connecting cranks 76, the connecting cranks of opposite spindles extending in opposite directions, and such oppositely extending cranks being connected together by a link 77 extending diagonally between the frames at each end thereof.

Adjacent the furnace end of the cooling apparatus the upper end of one of the nozzle control spindles is provided with a horizontally extending operating arm 78 which is connected to a Bowden wire or other suitable controlling mechanism 79 arranged to be controlled from any desired position.

With such an arrangement on operating the control mechanism 79, the nozzle control spindles are all pivoted simultaneously, the spindles of opposite frames pivoting in opposite directions and the nozzle control sleeves are in consequence all moved simultaneously towards or away from the inner or jet end of their corresponding nozzle.

Thus, the communication between the vent passage of each nozzle and the atmosphere may be closed altogether, or may be closed partially, so that the vacuum or depression at the inner end of each liquid jet can be varied and the amount of liquid sucked out of each jet by a given amount of air moving at a given velocity can be varied accurately so that the amount of liquid discharged on to the glass by a given quantity of air, as well as the rate of discharge of the liquid, can be varied to suit the nature, size and thickness of the glass which is being tempered.

It is found in practice that a considerable variation in the vacuum or depression at the inner end of each liquid jet is necessary to effect even a small variation in the rate of discharge of the liquid, so that the rate of discharge of the liquid can be varied very gradually and optimum discharge obtained in accordance with the particular piece of glass being operated upon.

As a result, the glass can be cooled at the optimum rate and the best results possible obtained.

Further, by regulating the vacuum at the inner end of each vacuum jet as opposed to providing an ordinary valve in the liquid distributing pipe 57, there is no possibility of dirt or grit which may lodge in the pipe affecting appreciably the rate of discharge of the liquid from a particular nozzle and thus lead to nonuniformity in the cooling of the glass with inevitable fracture.

For supplying the liquid to each of the nozzles, each frame is provided with a plurality of liquid supply tubes 80 which extend horizontally beyond each end of each frame, and these are arranged spaced one above the other, the tubes of each frame being supported at their ends by stationary uprights 81 extending vertically from the floor.

The tubes are conveniently of larger diameter intermediate their ends and the enlarged portion of each tube is formed on its upper side with a slot 82 extending for substantially the full length thereof.

For supplying the liquid from the tubes to each nozzle, the lower end of each of the distributing tubes 57 extends downwardly through the slots 82 into one or the other of the liquid supply tubes, the arrangement being conveniently such that each tube is adapted to supply liquid to two nozzles of each nozzle carrier.

For supplying the liquid to the liquid supply tubes there is provided a main liquid supply pipe 83 arranged above the tempering apparatus and carrying at its lower end a main liquid control cock 84 from which extends downwardly one to each frame a pair of main distributing tubings 85 the lower ends of which are connected to one end of the uppermost liquid supply tubes.

The opposite ends of the latter are connected to the corresponding end of the lowermost tube which is immediately beneath them, the arrangement being such that the liquid enters each of the uppermost tubes and passes therethrough into the lowermost tube.

In order to prevent overflow of the liquid through the slots, suitable cocks 86 are provided where the liquid enters the supply tubes.

With such an arrangement, on reciprocation of the frames occurring during tempering, the whole of the liquid supply tubes are stationary with the exception of the small diameter distributing tubes 57, with the result that variation in the flow of the liquid consequent on surging of the liquid is avoided, while the slots permit of free relative movement between the movable frames and the stationary supply tubes.

The compressed air is supplied to the nozzles from a main air distribution pipe 87 in the manner described in the said prior specification, the distribution pipe being provided with a main air control valve 88 as well as a pressure gauge 89.

For the reason and in the manner specified in the said prior specification, the central axis of each nozzle is inclined inwardly away from the withdrawal opening of the furnace, while the spacing of the nozzles and the throw of the crank and connecting rod mechanism as well as the pressure of the air supplied to the nozzles are preferably the values specified in the said specification.

By adopting such values, it will be found that with nozzles of a size identical to that depicted in Figures 7 and 8, the upper and lower edges of adjacent elongated sprays meet adjacent the faces of the glass sheet so that during cooling there is applied to the surface of the sheet layers of cooling medium which are substantially uniform and continuous in a direction along the major axes of the sprays, the overall travel of the frames relative to the stationary sheets being substantially equal to the distance between the adjoining vertical edges of adjacent layers of cooling medium.

Thus the cooling medium is so distributed in relation to each face of the sheet that the amount of liquid reaching each unit area of each face in equal time intervals is uniform and the degree of cooling of the two faces of each sheet is likewise uniform.

In order to prevent the glass sheets from oscillating laterally relative to the frames during the cooling operation, and for ensuring that they will be maintained at an equal distance from each set of nozzles, we provide a plurality of pairs of horizontal positioning wires 90 spaced apart horizontally by a distance somewhat greater than the maximum thickness of sheet normally operated upon, the wires extending horizontally from opposite ends of the frames and each pair of wires being spaced vertically one above the other so that whatever be the depth of the particular sheet which is being tempered it is engaged by at least one pair of wires and located against lateral movement in relation to the frames.

The wires are preferably of very small cross section to reduce as far as possible their heat capacity, while they may if desired be of flexible form and means may be provided for drawing the wires of each pair towards each other at opposite ends so that they are brought into close contact with the opposite faces of the sheet and lateral movement of the latter during tempering is positively prevented.

By providing a plurality of pairs of wires spaced apart vertically, there is no need to adjust the position of the wires in accordance with the particular depth of sheet to be tempered.

As in the case of the prior specification, for collecting the pieces of the sheet in the event of fracture occurring during cooling, there is provided a breakage tray 91, while endless band mechanism indicated generally at 92 and operated from an operating handle 93 is again provided for withdrawing the sheets from the heating furnace when they have been raised to the requisite temperature, the band being provided with a turnbuckle 94 which is adapted to engage a connecting rod 95 secured to one end of the tongs supporting strip 30.

In tempering glass sheets of square or rectangular shape with apparatus constructed as described above, each sheet is formed initially adjacent each end of one of its longer edges with an indentation, one indentation being formed on one face of the sheet and the other on the opposite face thereof as by drilling the faces, and the sheet is then suspended from the transfer rail 22 by running a set of carriages on to this rail and allowing one jaw of each pair of tongs at opposite ends of the carriages to enter one of the said indentations, the remaining jaws of these tongs and the jaws of the tongs intermediate the ends of the sheet engaging frictionally the faces of the sheet.

By suspending the sheet in the furnace in this manner mutilation of the sheet is reduced to a minimum.

The stop nuts 40 of the tongs are now adjusted to ensure that the jaws are positively maintained in engagement with the sheets, and the transfer rail 22 is now moved laterally until it is opposite to the return rail in the position shown in Figure 1, whereupon the carriages complete with sheet are advanced along the return rail on to the other transfer rail 21 adjacent the furnace which is initially in the dotted position shown in Figure 1, whereupon the latter is slidden transversely until it is opposite to the main supporting rail and the sheet is advanced through the feeding opening 17 into the main heating furnace and the transfer rail 21 moved back until it is again opposite to the return rail.

The furnace doors are in the meantime closed and during the heating of the sheet, which may occupy a period of up to five minutes, a second sheet is suspended similarly from the transfer rail 22 by means of a further set of carriages, and is similarly advanced into a position in which it is opposite the feeding opening of the furnace.

When the temperature attained by the sheet is approximately 650° C., so that the sheet commences to soften, the thermostatic control where provided operates to cut off the heating current and the crank and connecting rod mechanism is now driven to reciprocate the frames in the manner above described.

The sheet is now withdrawn from the furnace by engaging the connecting rod 95 with the turnbuckle 94 and the withdrawal mechanism operated to withdraw the heated sheet from the furnace until it is disposed between the frame so that the ends thereof are disposed at an equal distance from the adjacent vertical rows of nozzles when the frames are in the central position, a suitable guide being if desired provided to ensure that the sheet is withdrawn into the correct longitudinal position in relation to the frames.

The main air control cock 88 is now operated to supply air under a pressure of approximately 140 lbs. per square inch to the nozzle control cock 52, the correct number of which consistent with the size of the sheet have previously been opened, whereupon a spray of cooling liquids in a fine state of division is discharged simultaneously on to the two faces of the sheets which are thus cooled rapidly and the sheet tempered.

By arranging the nozzles so that the major axis of each elongated spray is vertical and transverse to the direction of reciprocation of the nozzles relative to the sheet, and by choosing for the spacing and dimensions of the nozzles and the travel of the frames the values specified above, it will be found that with an air pressure of approximately 140 lbs. per square inch, by suitably operating the control cocks the opposite faces of each sheet can be cooled simultaneously and uniformly over their entire or substantially their entire area.

It is found in practice that a cooling period of between 15 and 30 seconds is sufficient to produce the requisite hardness of the glass after which it is necessary to cool the glass still further by continuing the spraying operation in order that it can be handled without danger by the workpeople.

By suitably actuating the mechanism 79 for controlling the rate of delivery of the liquid, the rate of cooling of the glass can be varied in accordance with the size and thickness of the sheet as well as in accordance with the material thereof, while as the tempering operation proceeds, and particularly when complete tempering has been effected, the rate of delivery of the liquid can be increased by operating the said mechanism so that the glass can finally be cooled very rapidly to a temperature at which it can be conveniently handled.

As soon as the glass is sufficiently cool, the carriages complete with the cooled sheet are finally withdrawn from the end of the main supporting rail adjacent the cooling apparatus on to the adjacent transfer rail 22, and immediately this has been done the second sheet is advanced from the transfer rail 21 into the heating furnace, during the initial period of heating of which the first sheet is removed from the carriages.

After removal and during the latter part of the heating period of the second sheet, a third sheet may be suspended in position and the process repeated.

Instead of loading and unloading the sheets at one end only of the apparatus, loading may be performed adjacent the heating furnace and unloading adjacent the cooling apparatus.

The above described method of preventing impingement of the spray upon the edges of the sheet is only satisfactory when a single sheet is being tempered at a time, and will not permit of a plurality of sheets being disposed substantially adjacent one another and tempered simultaneously with the same apparatus.

Figure 10:
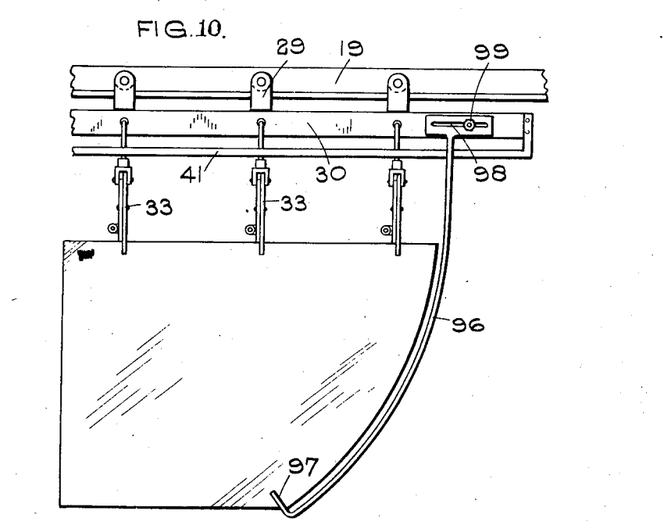
Figure 10 is a side elevation illustrating means for preventing the cooling medium from impinging on the edges of the sheets when sheets of small size are being tempered.

To permit of this being done satisfactorily the apparatus may, as shown in the modified construction illustrated in Figure 10, be provided with one or more shields or baffles adapted during tempering to shield one or more edges of the sheets from the cooling spray.

The baffles may, as shown in this figure, be constructed as flexible metal strips 96, and a plurality of such strips are conveniently provided and mounted upon the tongs supporting strip 30 so that they extend more or less downwardly therefrom and can be bent or deformed into a suitable shape and position so that they extend parallel to and adjacent one or more edges of the glass sheet during tempering and serve to shield such edges from the spray.

Each baffle strip may be provided at its lower end with a forked member 97, the arms of which extend on opposite sides of the sheet and serve to locate the baffle against lateral movement in relation to the sheet.

The baffle strips may be mounted adjustably in relation to the tongs supporting strip as by connecting them thereto through the medium of brackets constructed as strip metal plates of T shape provided with slots 98 through which extend screws 99 carried by the tongs supporting strip.

The liquid employed for effecting the tempering is with the present process a non-aqueous liquid having a lower cooling capacity than that of water or other aqueous liquid described in the said prior specification, and our liquid is preferably an organic liquid and it is preferred that it should be of an oily or fatty nature.

For example, the liquid may be a mineral oil, the preferred liquid being a paraffin oil having a comparatively low boiling point, such as an oil known commercially as a light lubricating oil, for example, spindle oil, or thin machine oil, although the oil sold as transformer oil is also satisfactory.

Where a light lubricating oil is employed as the cooling medium it is very desirable that such oil should have a boiling point of at least 170° C., and preferably at least 200° C.

We find that most satisfactory results are obtained in practice by using a paraffin oil of the above nature whose boiling point is above 200° C.

Instead of using a paraffin oil we may use a paraffin derivative, for example, a halogen substitution product of paraffin, preferably a dihalogen substitution product such as for instance methylene di-chloride.

Alternatively, the liquid may be a derivative of a cyclo-paraffin.

Alternatively, the liquid may be an ester, for example, an ester of a cyclic-alcohol, and if the liquid is an ester it is preferred to employ an ester of methylcyclohexanol, for example, dimethylcyclohexanyl oxalate, such substance being usually known commercially as methylcyclohexanyl oxalate.

Whatever liquid is employed it is very important that its temperature of combustion shall be higher than the softening temperature of the glass, to which temperature the glass is, of course, heated prior to tempering, so that during the tempering operation when the liquid comes into proximity or into contact with the heated glass there is no danger of it burning. It is further desirable that the liquid should have a latent heat of evaporation and/or specific heat substantially lower than that of water, and whatever liquid is employed it is preferred that its boiling point should be above 100° C., and desirably at least 200° C.

As compared with a tempering process in which the cooling medium comprises air or other gas, or in which it comprises an aqueous liquid, it is found that where the cooling medium comprises a non-aqueous liquid particularly a light lubricating oil there is much less likelihood of the glass fracturing completely or of its surface crazing as a result of non-uniform distribution of the cooling medium, and where a non-aqueous cooling liquid is employed it is therefore unnecessary to carry out the process in quite such an exact manner as is necessary where the cooling medium comprises a gas or a finely divided aqueous liquid so that less skill on the part of the operator is required, there being in fact an appreciably greater margin of safety when cooling is effected by a non-aqueous liquid, particularly a light lubricating oil.

Although we have referred to air as being employed for producing the finely divided state of the liquid, it should be understood that gases other than air may be so used.

The term "glass sheet" where used in the specification and claims should be understood as embracing any glass in flat or slightly curved form, while it should further be understood that although we have described the invention as being applied to the tempering of glass sheets it is applicable to the tempering of other glass articles in addition.

What we claim then is:

1. In apparatus for tempering glass articles, means for cooling the articles after the heating thereof, said cooling means comprising a plurality of nozzle adapted to discharge cooling liquid onto the surface of the article, said nozzles having each a liquid and a gas discharge orifice and having also passages for supplying liquid and gas respectively to said orifices, each of said gas discharge orifices being adapted to discharge a gas current at high velocity adjacent the corresponding liquid orifice and produce a suction in said corresponding liquid supply passage to propel the liquid in finely divided form onto the article, means for controlling the supply of gas to said gas discharge orifice, and means adapted to vary the suction produced within each of said liquid supply passages.

2. In apparatus for tempering glass sheets, means for cooling the sheets after the heating thereof, said cooling means comprising a plurality of nozzles adapted to discharge cooling liquid simultaneously onto each face of the sheet, said nozzles having each a liquid and a gas discharge orifice and having also passages for supplying liquid and gas respectively to said orifices, each of said gas discharge orifices being adapted to discharge a gas current at high velocity adjacent the corresponding liquid orifice and produce a suction in said corresponding liquid supply passage to propel the liquid in finely divided form onto each face of the sheet, means for controlling the supply of gas to said gas discharge orifice, and means adapted to vary simultaneously and equally the suction produced within each of said liquid supply passages.

3. In apparatus for tempering glass articles, means for cooling the articles after the heating thereof, said cooling means comprising a plurality of nozzles adapted to discharge cooling liquid onto the surface of the article, said nozzles having each a liquid and a gas discharge orifice and having also passages for supplying liquid and gas respectively to said orifices, each of said gas discharge orifices being adapted to discharge a gas current at high velocity adjacent the corresponding liquid orifice and produce a suction in said corresponding liquid supply passage to propel the liquid in finely divided form onto the article, said nozzles having each an opening adapted to provide a communication between the surrounding atmosphere and the respective liquid supply passage, and means adapted to vary the effective cross section of said opening.

4. In apparatus for tempering glass sheets, means for cooling the sheets after the heating thereof, said cooling means comprising a plurality of nozzles adapted to discharge cooling liquid simultaneously onto each face of the sheet, said nozzles having each a liquid and a gas discharge orifice and having also passages for supplying liquid and gas respectively to said orifices, each of said gas discharge orifices being adapted to discharge a gas current at high velocity adjacent the corresponding liquid orifice and produce a suction in said corresponding liquid supply passage to propel the liquid in finely divided form onto each face of the sheet, said nozzles having each an opening adapted to provide a communication between the surrounding atmosphere and the respective liquid supply passage, a sleeve movably mounted on the exterior of each of said nozzles, and means for moving all of said sleeves simultaneously to vary simultaneously and equally the effective cross section of each of said openings.

5. In apparatus for tempering glass sheets means for cooling the sheets after the heating thereof, said cooling means comprising a plurality of nozzles adapted to discharge cooling liquid simultaneously onto each face of the sheet, said nozzles having each a liquid and a gas discharge orifice and having also passages for supplying liquid and gas respectively to said orifices, each of said gas discharge orifices being adapted to discharge a gas current at high velocity adjacent the corresponding liquid orifice and produce a suction in said corresponding liquid supply passage to propel the liquid in finely divided form onto each face of the sheet, said nozzles having each an opening adapted to provide a communication between the surrounding atmosphere and the respective liquid supply passage, a sleeve mounted slidably on each of said nozzles and adapted to slide over the said communicating opening, a common operating control for sliding each of said sleeves, mechanism connecting said common operating control to each of said sleeves, and said mechanism being adapted on operation of said control to slide each of said sleeves simultaneously and equally.

6. In apparatus for tempering glass sheets, two sets of nozzles, means for supporting in a stationary manner a glass sheet, a movable carriage adapted to space said nozzles apart uniformly in relation to opposite faces of the sheet, each set of nozzles being adapted to discharge cooling liquid simultaneously on to one of the two faces of the sheet and at a fixed angle in relation to each face, a stationary guide for said carriage, means for reciprocating said carriage on said guide in relation to said sheet, stationary troughs for supplying the liquid to the nozzles during the tempering of the sheet, said troughs extending substantially parallel to the path of reciprocation of the nozzles, said nozzles having tubes reciprocable therewith extending into said troughs and connecting said troughs directly to said nozzles and adapted during reciprocation of said nozzles to supply liquid from said troughs simultaneously to each of said nozzles.

7. In apparatus for tempering glass sheets, two sets of nozzles, means for supporting in a stationary manner a glass sheet, a movable carriage adapted to space said nozzles apart uniformly in relation to opposite faces of the sheet, each set of nozzles being adapted to discharge cooling liquid simultaneously on to one of the two faces of the sheet and at a fixed angle in relation to each face, a stationary guide for said carriage, means for reciprocating said carriage on said guide in relation to said sheet in a horizontal direction, horizontal stationary troughs for supplying the liquid to the nozzles during the tempering of the sheet and arranged below their respective nozzles, said troughs having elongated longitudinal openings on their upper sides, distributing tubes of small length and small cross section reciprocable with said nozzles extending therefrom directly through the said openings into the said liquid supply troughs, said distributing tubes being adapted to supply liquid from said stationary troughs simultaneously to each of said nozzles and during the reciprocation thereof.

HAROLD PERRY.
A. W. GROTEFELD.

CERTIFICATE OF CORRECTION.

Patent No. 2,265,308. December 9, 1941.

HAROLD PERRY, ET AL.

It is hereby certified that error appears in the printed specification of the above numbered patent requiring correction as follows: In the heading to the printed specification, lines 8 and 9, strike out ", now Patent No. 2,199,511, dated May 7, 1940"; page 6, first column, line 7, claim 1, for "nozzle" read --nozzles--; line 13, same claim, for "velocity" read --velocity--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patent.